Dec. 27, 1949   L. K. KAEBURN   2,492,646
PHOTOGRAPHIC CAMERA FOR VARIABLE
CONSECUTIVE EXPOSURES

Filed Jan. 24, 1946   3 Sheets-Sheet 1

INVENTOR.
Leslie K Kaeburn
BY

Dec. 27, 1949  L. K. KAEBURN  2,492,646
PHOTOGRAPHIC CAMERA FOR VARIABLE
CONSECUTIVE EXPOSURES

Filed Jan. 24, 1946  3 Sheets-Sheet 2

INVENTOR.
Leslie R. Kaeburn
BY

Dec. 27, 1949 L. K. KAEBURN 2,492,646
PHOTOGRAPHIC CAMERA FOR VARIABLE
CONSECUTIVE EXPOSURES
Filed Jan. 24, 1946 3 Sheets-Sheet 3

INVENTOR.
Leslie K. Kaeburn
BY

Patented Dec. 27, 1949

2,492,646

UNITED STATES PATENT OFFICE 2,492,646

PHOTOGRAPHIC CAMERA FOR VARIABLE CONSECUTIVE EXPOSURES

Leslie K. Kaeburn, New York, N. Y.

Application January 24, 1946, Serial No. 643,065

4 Claims. (Cl. 88—18)

My present invention relates to photographic cameras.

It is an object of my present invention to provide a photographic camera which is extremely simple to operate and can be used by everybody, even by laymen, without any knowledge of photography.

It is a further object of my present invention to provide a camera with means eliminating the necessity of setting the exposure time before taking of pictures.

Still a further object of my present invention consists in a camera which is constructed in such a manner as to enable automatic taking of a series of consecutive pictures of the same object with different exposure times.

With the above objects in view, my present invention mainly consist in providing in a photographic camera means which are adapted to produce automatically after each operation of the camera operating means, e. g. the shutter releasing means, several consecutive pictures with various exposure times.

In this way, it is possible to obtain by one simple operation of the shutter releasing means, e. g. by once pushing down the shutter releasing trigger, on the film strip a series of for instance, four pictures of the same object, each of which pictures is exposed for another period of time, e. g. the first picture for $\frac{1}{4}$ of a second, the second picture for $\frac{1}{20}$ of a second, the third picture for $\frac{1}{80}$ of a second, and the fourth picture for $\frac{1}{200}$ of a second. Taking into consideration the fact that film emulsions used at present have a very wide latitude as far as exposure time is concerned, it is evident that one of the four pictures thus taken will be correctly exposed.

Thus, it is possible to obtain a correctly exposed picture without any necessity of computing the exact exposure time. Of course, it should be stressed that even after most careful computations pictures taken with cameras known at present are often under or over exposed; also this disadvantage is avoided by use of a camera according to my present invention since it is evident that one of the several pictures taken with different exposure times will be exposed correctly.

In accordance with a preferred embodiment of my present invention, I provide in a camera of the type proposed by me shutter releasing means and shutter means constructed and arranged so as to expose after each operation of these shutter releasing means automatically several consecutive portions of a film strip with different exposure times.

Thus, a camera of the type proposed by me comprises as main elements a camera lens, a film gate, film transporting means, shutter means, and combined operating means for simultaneously operating the mentioned film transporting means and releasing the mentioned shutter means; these operating means have to operate in such a manner that after each operation, the film transporting means intermittently transports several consecutive portions of the film strip to be exposed past the film gate arranged behind the camera lens and the shutter means automatically expose these consecutive film portions with different exposure times.

I have found that it is possible to construct a camera of the type defined above by using a shutter on which different shutter openings, i. e. shutter openings having different sizes, are arranged in a row behind each other; this shutter is rotated by a relatively strong helical spring.

Furthermore, I have found that it is advisable to provide in combination with such a shutter, film transporting means which are operated by the shutter itself. Preferably, I provide a series of film transporting members, one corresponding to each of the different shutter openings and mount the same on the shutter body itself; these film transporting members cooperate during turning of the shutter with film supporting means, e. g. a film sprocket, in such a manner that the film is transported between the consecutive exposures through the different shutter openings and is at stand-still during the consecutive exposures through these different exposure openings.

The novel features which I consider as characteristic for my invention are set forth in particular in the appended claims. The invention itself however, both as to its construction and its method of operation, together with additional objects and advantages thereof, will be best understood from the following description of specific embodiments when read in connection with the accompanying drawings, in which:

Figure 1:
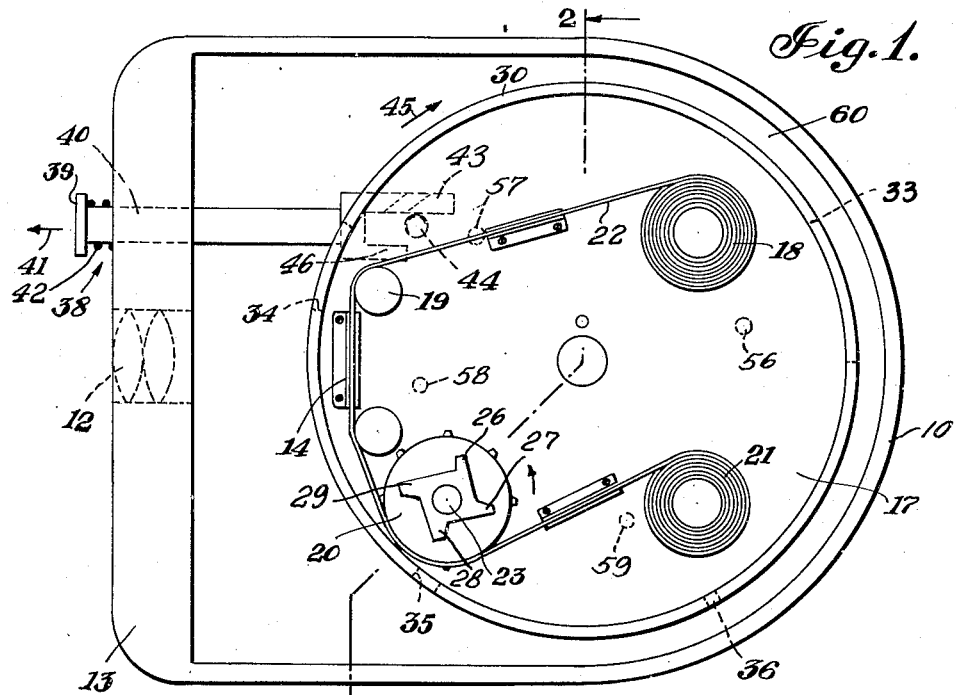
Fig. 1 is a side view of a camera according to my present invention with the camera cover removed.
Figure 2:
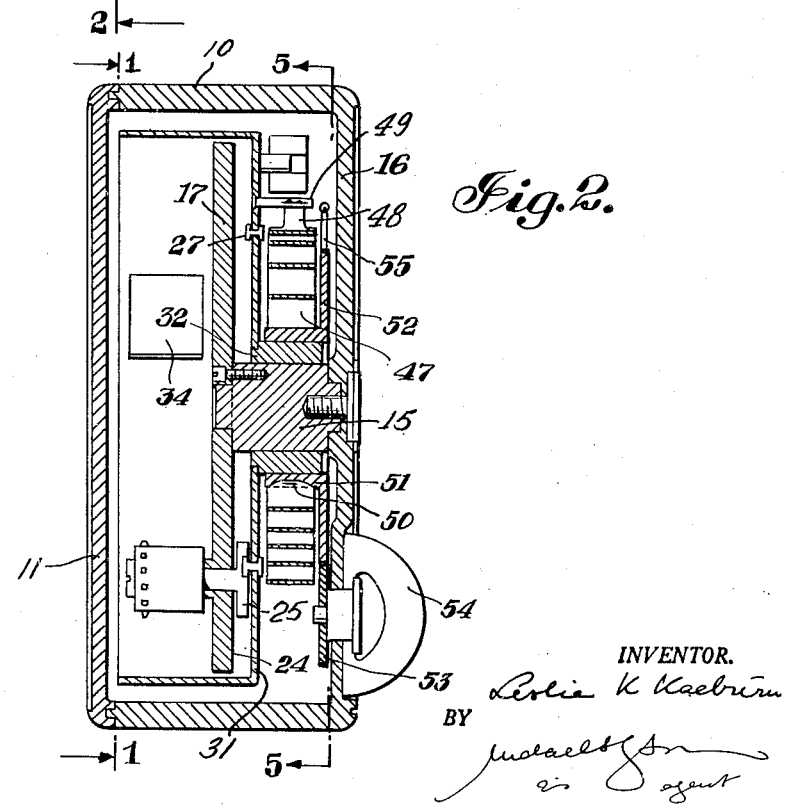
Fig. 2 is a cross section through the camera shown in Fig. 1, along line 2—2 of Fig. 1.

As shown in Figs. 1 and 2, my new camera comprises as usual, a camera housing 10, a camera cover 11, a camera lens 12 arranged in front wall 13 of the camera housing 10, and a film gate 14 arranged behind the camera lens 12 in the path of the light beam passing through the lens 12.

The film guiding mechanism is mounted on a centrally arranged body member 15 which is, as shown in Fig. 2, firmly secured to the side wall 16 of the camera housing 10. This body member 15 carries, firmly secured thereto, a stationary supporting plate 17 which has, as shown in Fig. 1, a somewhat irregular shape.

This guiding mechanism consists of the supply roll 18 on which the exposed film is wound up, the guiding idler roller 19, the film gate 14 mentioned above, the freely rotatable mounted transporting sprocket 20, and the take-up roll 21.

The film strip 22 passes from the supply roll 18 to the guiding idler roller 19, past film gate 14 and along the transporting sprocket 20 to the take-up roll 21.

The film is transported from the supply roll 18 past film gate 14 to the take-up roll 21 by rotation of the transporting sprocket 20. In order to enable rotation of this sprocket 20, the same is provided with shaft 23 carrying on the rear side 24 of the supporting plate 17 a small flat disc 25. This disc 25 has the shape shown in Fig. 1, i. e. is provided with four projections 26, 27, 28, 29; intermittent turning of these projections results in intermittent turning of sprocket 20 and intermittent transportion of the film strip 22 to be exposed from supply roll 18 past film gate 14 to take-up roll 21. The means by which the small disc 25 is intermittently turned will be described further below in detail.

Figure 3:
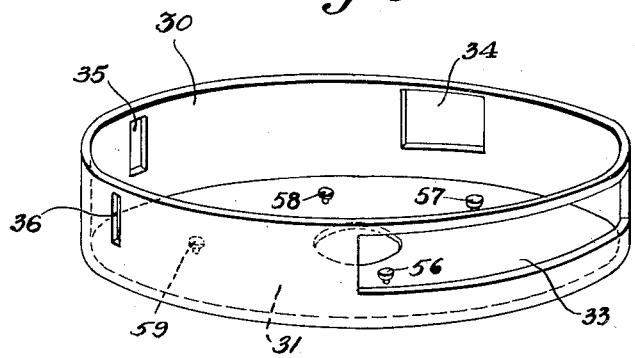
Fig. 3 is a perspective view of a shutter of the type used in a camera of the type shown in Figs. 1 and 2.

The shutter system used for my new camera has the shape shown in Fig. 3: it consists of a cylindrical shutter member 30 which is open on one side and closed on the other side by the circular disc 31 firmly secured to one edge of shutter member 30. Disc 31 actually supports the cylindrical shutter member 30 and is freely rotatably supported as indicated at 32 by the stationary body member 15 described above in detail.

In accordance with my present invention, different shutter openings 33, 34, 35, 36 are provided, as shown in Fig. 3, in the cylindrical shutter member 30. All these shutter openings are rectangular and have an equal width; however, the length of these shutter openings in direction of rotation of the shutter 30 are different from each other. Thus, in the embodiment shown, the shutter opening 33 has an angular opening of 90°, shutter opening 34 an angular opening of 18°, shutter opening 35 an angular opening of 4°30′, and shutter opening 36 an angular opening of 1°48′. Assumed that the speed of the shutter is 60 R. P. M. it will make one revolution in one second. In this case, as easily computed, a film arranged behind the shutter 30 will be exposed through the shutter opening 33, $1/4$ of a second, through the shutter opening 34, $1/20$ of a second, through the shutter opening 35, $1/80$ of a second, and through the shutter opening 36, $1/200$ of a second.

It is evident and does not need any further explanation that with a shutter of this type it is possible to expose four consecutive portions of a film moving intermittently through film gate 14 four times, each time with a different exposure time, namely the first time with $1/4$ of a second, the second time with $1/20$ of a second, the third time with $1/80$ of a second, and the fourth time with $1/200$ of a second.

Of course, in order to obtain such consecutive exposures, it is necessary to provide means by which the shutter 30 can be turned exactly about 360° by each operation of the shutter releasing means. Shutter releasing means adapted for these purposes are shown in Fig. 1 and consist of a catch 44 secured as shown to the cylindrical shutter member 30 and a push button arrangement 38. This push button arrangement comprises a push button 39 secured to a rod 40 passing through an opening in the front wall 13 of the camera housing 10. The push button 39 is forced permanently outward in direction of arrow 41 by means of spring 42. The rod 40 mentioned above is L-shaped and engages in inoperative position with its bent portion 43 the catch 44. In operative position, when push button 39 is pushed inward against direction of arrow 41, the L-shaped portion 43 of rod 40 is adapted to pass along catch 44, and thus catch 44 is released and the shutter 30 free to rotate in direction of arrow 45.

After the shutter 30 has made one revolution, catch 44 reaches again the position shown in Fig. 1, and abuts against the bent arm 43 of rod 40 preventing further turning of the shutter. Thus each time push button 39 is pressed and released the shutter 30 will carry out one full revolution.

In order to prevent the shutter 30 from rotating more than 360°, even if the push button is unintentionally held pressed inward for a longer time, I provide an additional catch arm 46 against which catch 44 will abut if the push button 39 is retained in pressed inward position.

For rotating the shutter 30 I provide a helical spring 47 arranged as shown in Fig. 2: the outer end 48 of this spring 47 is secured by means of pin 49 to the circular disc 31 forming part of the shutter 30. The inner end 50 of this spring is secured to the sleeve member 51 arranged freely rotatably about the stationary body member 15. This sleeve member 51 is firmly connected with spur gear 52 which latter is in mesh with another spur gear 53 firmly secured to the spring winding knob 54. Thus, by turning winding know 54, it is possible to wind up the spring 47. A pawl mechanism 55 of known type turnably mounted to camera casing 10 and cooperating with spur gear 52 prevents turning of this gear against the direction of winding of the spring 47 and thus prevents in known way unwinding of the spring after winding.

Figure 4:
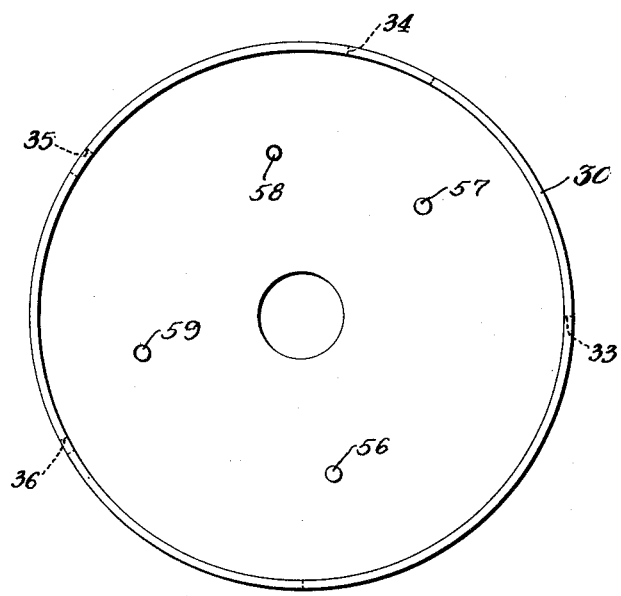
Fig. 4 is a side view of the shutter shown in Fig. 3.
Figure 5:
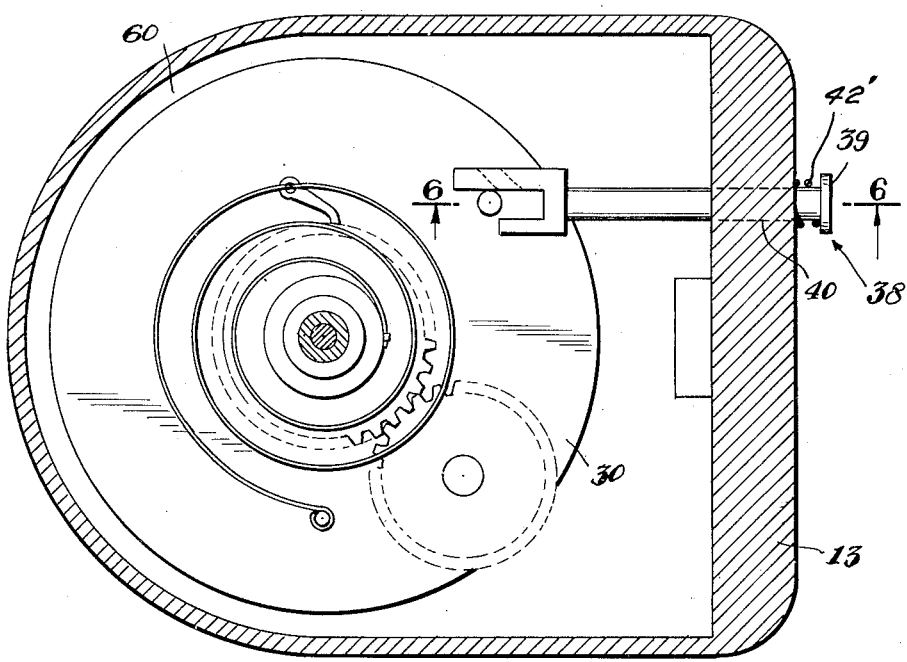
Fig. 5 is a longitudinal section through the camera shown in Figs. 1 and 2, along the line 5—5 of Fig. 2.
Figure 6:
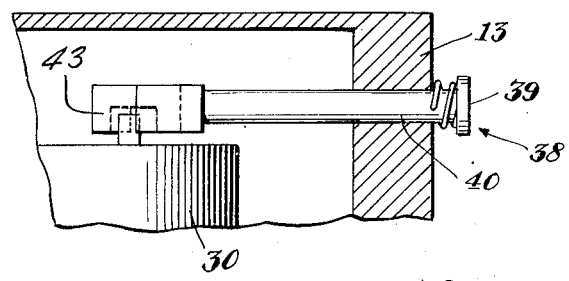
Fig. 6 is a top view of the releasing push button means of the camera.

In order to intermittently transport the film past the film gate 14 by intermittent turning of the transporting socket 20, I provide as shown on Fig. 4, on the inner side of the circular disc 31 forming part of the shutter 30 four pins, 56, 57, 58, 59 each corresponding to one of the shutter openings 33, 34, 35, 36 respectively. These pins 56, 57, 58 and 59 are arranged at equal distance from the axis of rotation of the shutter 30, but at different distances from each other. During rotation of the shutter, these pins consecutively hit against the projections 26, 27, 28 and 29 of the small disc 25 secured to shaft 23 of the transporting sprocket 20. Each time one of the pins hits during rotation of the shutter 30 against one of the projections on the small plate 25, the transporting sprocket 20 will be turned by 90°

It is evident that the pins 56, 57, 58 and 59 have to be arranged in such a manner that they are hitting against the corresponding projections 26, 27, 28 and 29 respectively only when none of the shutter openings 33, 34, 35 and 36 provided in the cylindrical shutter member 30 is in front of the film gate 14. Thus, it is possible to transport the film when none of the shutter openings are in front of the film gate 14, and to maintain the film at stand-still while these shutter openings are passing the film gate.

My new camera operates as follows:

After the film is inserted in well-known way and spring 47 wound up by means of winding knob 54, the camera is ready for operation. To operate the camera, it is only necessary to push once against knob 39 against direction of arrow 41 and to release the knob. By such pushing movement, catch 44 is released and the shutter 30 carries out one full revolution until catch 44 abuts against the bent arm 43, stopping the shutter.

During this revolution of the shutter 30, the four shutter openings 33, 34, 25, 36 pass one after the other past the film gate 14 exposing the film passing through this film gate. The shutter however, not only exposes the film, but also serves for transporting the same.

In order to explain how the film is transported past film gate 14 it might be assumed that at the start of the operation of the camera the shutter opening 33 is immediately before the film gate 14 and that the film in film gate 14 has not yet been exposed. Then, by pushing against knob 39 the shutter 30 will be released and start to rotate and shutter opening 33 will move past the film gate 14, exposing the film portion in the same. Immediately after the shutter opening 33 has moved past the film gate 14, the pin 56 secured to the rotating shutter 30 will hit the projection 26 and turn the transporting sprocket 20 by 90°. This will result in movement of an unexposed film portion into the film gate 14. After this occurs, the next shutter opening 34 will move past film gate 14 and expose the next film portion. After this exposure has taken place, the next pin, namely pin 57 will hit against the next projection, namely against projection 27 and move the film again as described above. It is evident that this periodical exposure and film transport will repeat itself until the shutter has come to a stand-still. Altogether, during each exposure cycle, i. e. during each full revolution of the shutter there will be four separate exposures and four separate film movements between these exposures. Due to the different size of the shutter openings of course, each of the four mentioned exposures will last a different length of time, as explained above.

It will be understood that each of the elements described above, or two or more together, may also find a useful application in other types of photographic cameras, differing from the types described above.

While I have illustrated and described the invention as embodied in photographic cameras provided with rotating shutters, I do not intend to be limited to the details shown, since various modifications and structural changes may be made without departing in any way from the scope of the appended claims.

What I claim as new and desire to secure by Letters Patent is:

1. In a photographic camera in combination, a camera lens; a film gate; a rotatable cylindrical shutter provided with a series of different consecutively arranged shutter openings in its cylindrical surface and arranged so that said shutter openings are adapted to move consecutively past said film gate; a spring for rotating said cylindrical shutter; shutter releasing means for releasing after each operation of said means said cylindrical shutter so that the same is rotated by said spring so that all said shutter openings are moving once, one after the other, past said film gate; film supporting means including a film sprocket for guiding said film strip past said film gate; and film transporting means operated by said cylindrical shutter and adapted to turn said film sprocket in such a manner that said film strip is intermittently moved after each operation of said shutter releasing means past said film gate between the consecutive movements of said different shutter openings past said film gate and is in stand-still while one of said different shutter openings is in front of said film gate.

2. In a photographic camera, in combination, a camera lens; a film gate; a rotatable cylindrical shutter provided with a series of different consecutively arranged shutter openings in its cylindrical surface and arranged so that said shutter openings are adapted to move consecutively past said film gate; a spring for rotating said cylindrical shutter; shutter releasing means for releasing after each operation of said means said cylindrical shutter so that the same is rotated by said spring so that all said shutter openings are moving once, one after the other, past said film gate; film supporting means including a film sprocket for guiding said film strip past said film gate; and film transporting means carried by said cylindrical shutter and adapted to turn during rotation of said cylindrical shutter said film sprocket in such a manner that said film strip is intermittently moved after each operation of said shutter releasing means past said film gate between the consecutive movements of said different shutter openings past said film gate and is in stand-still while one of said different shutter openings is in front of said film gate.

3. In a photographic camera in combination, a camera lens; a film gate; a rotatable cylindrical shutter provided with a series of different consecutively arranged shutter openings in its cylindrical surface and arranged so that said shutter openings are adapted to move consecutively past said film gate; a spring for rotating said cylindrical shutter; shutter releasing means for releasing after each operation of said means said cylindrical shutter so that the same is rotated by said spring so that all said shutter openings are moving once, one after the other, past said film gate; film supporting means including a film sprocket for guiding said film strip past said film gate; and a series of film transporting means each corresponding to one of said different shutter openings of said cylindrical shutter, each of said film transporting means being adapted to turn said film sprocket in such a manner that said film strip is intermittently moved after each operation of said shutter releasing means past said film gate between the consecutive movements of said different shutter openings past said film gate and is in stand-still while one of said different shutter openings is in front of said film gate.

4. In a photographic camera in combination, a camera lens; a film gate; a rotatable cylindrical shutter provided with a series of different consecutively arranged shutter openings in its cylindrical surface and arranged so that said shutter openings are adapted to move consecutively past said film gate; a spring for rotating said cylindrical shutter; shutter releasing means for releasing after each operation of said means said cylindrical shutter so that the same is rotated by said spring so that all said shutter openings are moving once, one after the other, past said film gate; film supporting means including a film sprocket for guiding said film strip past said film gate; and a series of film transporting means carried by said cylindrical shutter, each of said film transporting means adapted to turn during rotation of said cylindrical shutter said film sprocket in such a manner that said film strip is intermittently moved after each operation of said shutter releasing means past said film gate between the consecutive movements of said different shutter openings past said film gate and is in stand-still while one of said different shutter openings is in front of said film gate.

LESLIE K. KAEBURN.

REFERENCES CITED

The following references are of record in the file of this patent:

UNITED STATES PATENTS

| Number | Name | Date |
| --- | --- | --- |
| 601,951 | Davis | Apr. 5, 1898 |
| 1,262,255 | Rector | Apr. 8, 1918 |
| 1,319,698 | De Brayer | Oct. 28, 1919 |
| 1,378,462 | Jenkins | May 17, 1921 |
| 1,407,357 | Tartara | Feb. 21, 1922 |
| 1,563,394 | Owens | Dec. 1, 1925 |
| 1,572,863 | Owens | Feb. 9, 1926 |
| 1,830,602 | Goldberg | Nov. 3, 1931 |
| 1,932,691 | Cole | Oct. 31, 1933 |
| 1,997,642 | Klein | Apr. 16, 1935 |
| 2,051,519 | Cole | Aug. 18, 1936 |
| 2,119,200 | Campbell | May 31, 1938 |

FOREIGN PATENTS

| Number | Country | Date |
| --- | --- | --- |
| 594,546 | France | Sept. 14, 1925 |
| 265,048 | Great Britain | Feb. 3, 1927 |